United States Patent [19]

Mincone et al.

[11] Patent Number: 4,585,904
[45] Date of Patent: Apr. 29, 1986

[54] PROGRAMMABLE COMPUTERIZED TELEPHONE CALL COST METERING DEVICE

[75] Inventors: Raymond Mincone, Melville; Richard L. Miller, Dix Hills; Louis C. Vella, Selden; Bosah Erike, Port Jefferson, all of N.Y.

[73] Assignee: General Telephone Inc., Melville, N.Y.

[21] Appl. No.: 568,790

[22] Filed: Jan. 6, 1984

Related U.S. Application Data

[63] Continuation-in-part of Ser. No. 346,395, Feb. 5, 1982, abandoned.

[51] Int. Cl.⁴ ............................................. H04M 15/00
[52] U.S. Cl. .............................. 179/7.1 TP; 179/7.1 R
[58] Field of Search ................ 179/7 R, 7 MM, 7.1 R, 179/7.1 TP, 90 BB, 90 B, 90 BD

[56] References Cited

U.S. PATENT DOCUMENTS 4,122,308 10/1978 Weinberger et al. .............. 179/7.1 R
4,264,956  4/1981 Delaney ................................. 364/467
4,389,546  6/1983 Glisson et al. ....................... 179/18 B

FOREIGN PATENT DOCUMENTS 2105149  3/1983 United Kingdom ............. 179/6.3 R

OTHER PUBLICATIONS

*Telecommunications*, vol. 15, No. 8, Aug. 1981, p. 43, "Mike Talks Back".

Primary Examiner—Gene Z. Rubinson
Assistant Examiner—Elio Di Vito
Attorney, Agent, or Firm—Richard L. Miller

[57] ABSTRACT

A programmable computerized telephone cost metering device which gives a visual display of the cost (per unit of time) of a call before the user completes dialing his intended number, total cost of call in progress, and total of costs for day or month. Metering device may be programmed for user's telephone exchange and type of service he has contacted with his telephone company, and programing may be inputted and updated by any of several methods including: direct user inputting of information, insertion of an EPROM chip, voice recognition device, and an automatic inputting of data from a remote data bank by means of a built in MODEM. Security of access is assured by use of user programmed access code. The metering device may contain a built in telephone or may be used with existing telephone instruments. There are a host of other operating features which this combination of computer, telephone, information storage, input and output devices can perform depending upon the configuration of the computer operating system.

25 Claims, 7 Drawing Figures

PROGRAMMABLE COMPUTERIZED TELEPHONE CALL COST METERING DEVICE

BACKGROUND OF THE INVENTION

This application is a continuation in part of copending application Ser. No. 06/346,395, filed Feb. 05, 1982, which is to be expressly abandoned simultaneously with the filing of this application.

The present invention is directed to a programmable telephone call cost metering device for providing information, on a real time basis, as to the cost of telephone calls made from a telephone equipped with this device to any other telephone.

In order to assist in controlling the rapidly rising costs of telephone service it is highly desirable to provide a metering device which is capable of indicating, on a real time basis, the costs of telephone calls made from the associated telephone. The billing techniques employed within the telephone company system itself employ metering pulses and/or other techniques which are either not available or not suitable for incorporation in decentralized telephone cost metering devices of the type herein described.

Several attempts have been made to provide such a system of telephone call cost monitoring. Weinberger (U.S. Pat. No. 4,122,308) in 1978 and Pavda (U.S. Pat. No. 4,041,291) in 1977 designed systems for call cost monitoring, however, neither system has means for programming specific telephone exchange numbers and applicable rates from known sources, such as the local telephone directory, and updating rapidly changing billing rates at a moments notice. Both systems contain on board memory devices, which are programmed at the time of manufacture and are therefore unresponsive to the need for EASY UPDATE, or for ENTRY OF LOCAL AND LONG DISTANCE TELEPHONE EXCHANGE DATA AND RATES, as may be applicable to the users calling area.

Recent U.S. Government action which has resulted in the divestiture of the Bell Telephone Companies from the parent company, American Telephone and Telegraph, and prior actions of deregulation have resulted in the establishment of alternative routing mean for telephone calls through competitive telecommunications systems. At the present state of the art it is difficult to determine the exact cost associated with many particular calls through any particular telecommunications system or combinations of systems and it is thereby difficult to decide upon the most cost effective routing.

SUMMARY OF THE INVENTION

It is therefore the primary object of the present invention to provide a telephone call cost measuring device in which the rate information may be programmed by the user in a multiplicity of ways.

It is a further object of the present invention to permit programming of rates by means of a programmable read only memory, known as PROM, which may be programmed by the manufacturer of the call cost metering device, updated by this manufacturer and inserted into the device by the user of the device.

It is a further object of the present invention to permit programming of rates as found in the local telephone directory, directly by the user by means of data entry in which the user presses data entry keys located on the call metering device.

It is a further object of the present invention to permit programming of rates by means of a built in MODEM over which rate information may be provided from a central data bank through associated telephone lines and therein to memory contained in the call cost metering device.

It is still a further object of the present invention to provide a call cost metering device which can automatically determine the cost of each of a multiplicity of possible routes and direct the device to implement the most cost effective of the available routes.

Another object is to provide a telephone call cost metering device which can be programmed in order to limit access to only those parties who have been assigned access codes and to limit the ability to change user programming to only those parties who have been assigned program access codes and to allow such access to the telephone according to pre-programmed dates and times.

Another object is to provide ways for dialing specific numbers, area codes and exchanges which maybe dialed by the user to certain programmed area codes and exchanges, and certain emergency local calls according to those assigned by user, thereby restricting the random use of the telephone from unauthorized calling.

Another object is to provide a telephone cost metering device which can provide data on telephone usage according to programmed instruction. This allows analysis of telephone usage by month, day, time of day, user, telecommunication carrier and any other desired variable which may be displayed.

Another object is to provide a telephone call cost metering device which may be connected to an accessory peripheral device such as printer, storage device or MODEM to input and/or output information in various formats.

Another object is to provide ways for inputting data by voice recognition circuitry and outputting data by voice synthesis circuitry.

Another object is to provide ways for programming the invention to dial from a list of pre-programmed telephone numbers in order to have the device work as an automatic dialer.

Another object is to provide ways for programming the invention to alert the user that some pre-programmed maximum call cost has been reached.

Another object is to provide ways for programming the invention to alert the user as to some predetermined instruction such as a wake up signal, reminder of an important date or any other predetermined variable.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENT

Figure 1:
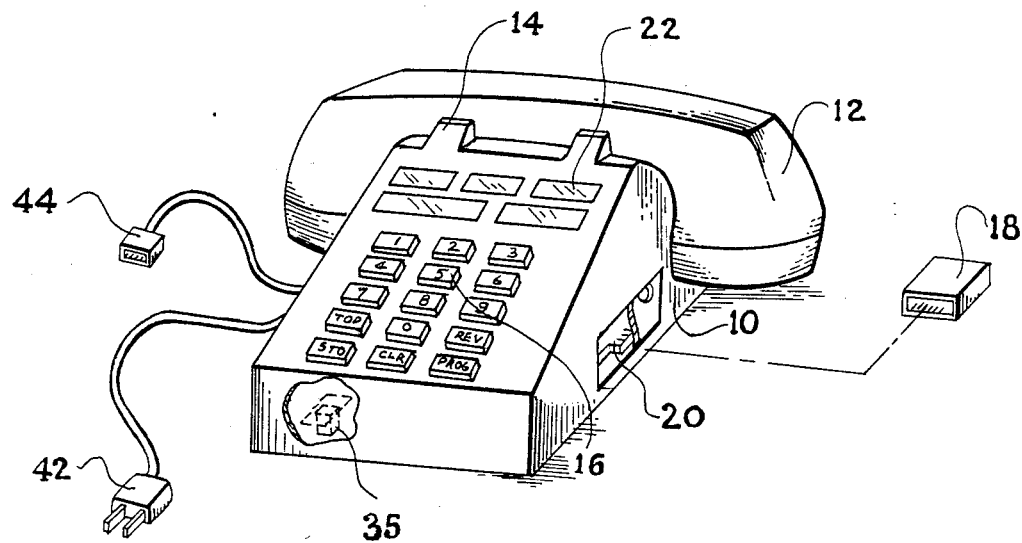
FIG. 1 is a perspective view of the invention, as an integral telephone, showing the insertion of a programmed module (PROM) into a corresponding opening.

Reference is now made in greater detail to the drawing.

FIG. 1 is a representation of the invention with an integral telephone. This embodiment consists of a case 10, shown with standard telephone handset 12 resting in cradle 14. Also shown is a data entry pad 16 with fifteen keys. An erasable programmable read only memory, hereinafter referred to as EPROM 18 is shown in position, ready for insertion into EPROM socket 20. When the instant invention is operated the user may have a choice of entering telephone rate information and operating system information by at least one of the following methods: keying data, that is by depressing keys which comprise the date entry pad 16, or speaking into a voice recognition input device 94 of FIG. 4, by inserting the EPROM 18 into EPROM socket 20, or by using a remote entry method, such as a MODEM, which will be described. Readout of data is visible on the display 22 when the invention is in use.

Figure 2:
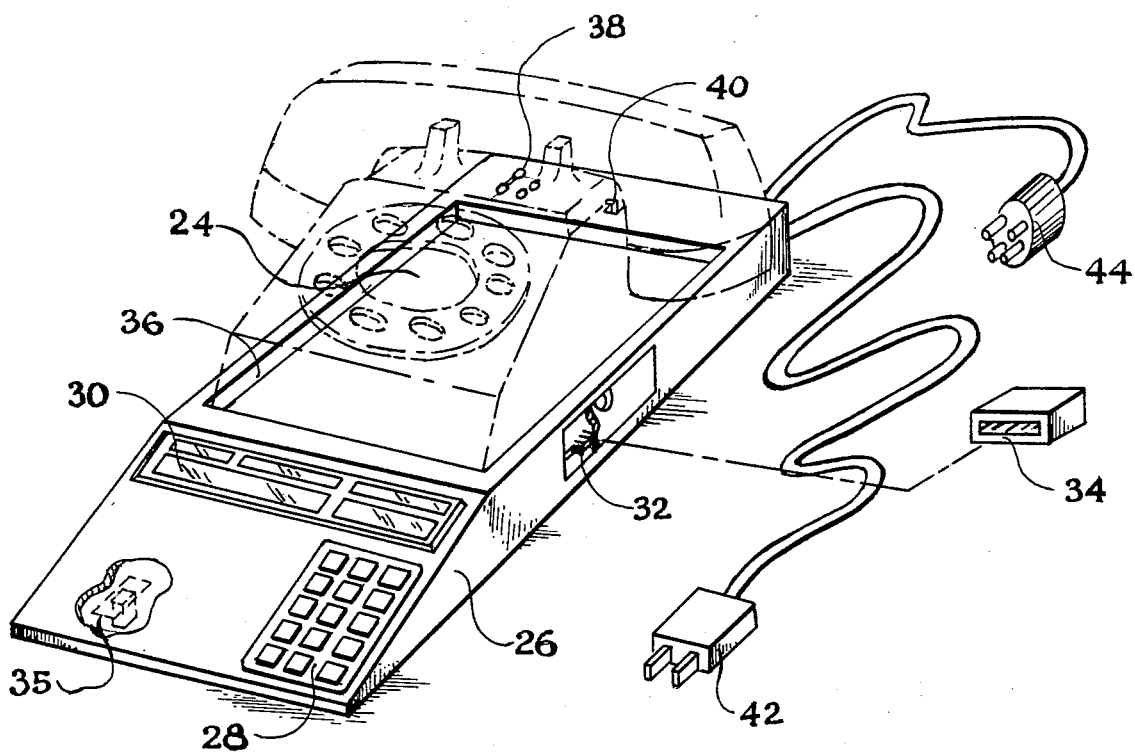
FIG. 2 is a perspective view of the invention which shows the invention without an integral telephone but with a conventional telephone, represented by dotted lines, placed on top of the invention.

FIG. 2 is an alternate representation of the invention showing a conventional type telephone 24, shown in dotted lines, resting on top of an embodiment of the invention designed for this purpose. This embodiment consists of a base 26 which contains a data entry pad 28, display 30 and EPROM socket 32. An EPROM 34 is shown in position ready to be inserted into EPROM socket 32. A case depression 36 is provided to allow the telephone to sit on top of the invention without permitting lateral movement of the telephone. A four-prong telephone socket 38 and a modular telephone socket 40 are provided so that either type of termination mounted on the end of a pre-existing conventional telephone may be inserted.

It is to be noted that the following applies to all embodiments: The connection of the invention to conventional house power such as 115 volt wall socket is via line cord 42. Switch 35 is used to allow the user to elect pulse or tone output dialing signal. The invention may be connected to the telephone line via telephone plug 44 or any plug configuration with at least two pins. Although this invention is shown hard wired to a telephone line via plug 44 a cordless connection utilizing electromagnetic waves between a hand set and a base station may be used.

Figure 3:
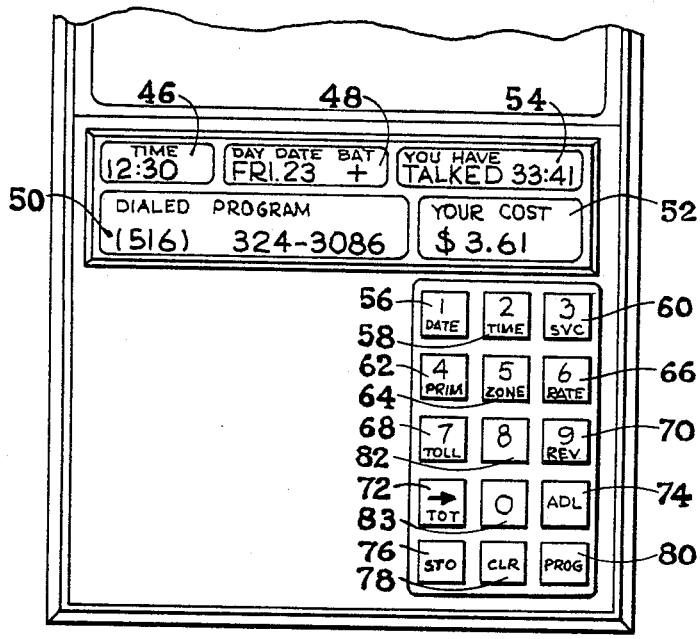
FIG. 3 is an enlarged detailed view of FIG. 2 showing the keyboard and display.

FIG. 3 is a detailed representation of the display and the data entry pads previously mentioned. The function of each display window and each key will be given followed by a detailed explanation of representative programming. The display windows function as follows:

Window 46: TIME OF DAY, AM or PM functions.

Window 48: DAY, DATE and the condition of the BATTERY.

Window 50: Is the DATA ENTRY window. The NUMBER DIALED will appear to alert the user if he has misdialed. PROGRAMMED DATA will be displayed for the user to monitor the accuracy of all his entries prior to storing into memory.

Window 52: Will display cost data at four different periods of time as follows:
   INITIAL COST DATA will tell the user the (1) initial one minute charge of his call before he completes dialing his intended number.
   CURRENT COST DATA will convey the (2) cumulative cost of his call while the user is still in conversation.
   TOTAL COST DATA will convey to the user the total cost of all calls made from that telephone, (3) up to that moment of the day and from (4) the first day of the month, simultaneously.

NOTE: Data displayed in Window 52 will pulsate to attract the user's attention.

Window 54: ELAPSED TIME DATA will convey how long (minutes/seconds) the user has been on the line. After the call has been completed, this total is added to any prior sub-totals for that day and displayed upon request as a TOTAL TIME spent on the phone that day.

The keys of the key entry pad function as follows: Each of the conventional keys numbered 1-7, 9 and TOT have dual functions, the rest of the keys have single functions.

Key 56: DATE is used to enter Date Information, or the numeral "1".

Key 58: TIME is used to enter Time Information, or the numeral "2".

Key 60: SVC is used to enter Service and Rate information such as the type of service contracted with the telephone company, the user's exchange number and the rates for his area, or the numeral "3".

Key 62: PRIM is used to enter all the Primary Area exchange numbers in the users local calling area, or the numeral "4".

Key 64: "ZONE" is used to enter specific Zone Numbers listed in the users primary calling area or the numeral "5".

Key 66: RATE is used to enter Rates from the user's zone to other zones listed in this primary calling area, or the numeral "6".

Key 68: TOLL is used to enter Long Distance Numbers and Rates or the numeral "7".

Key 70: Key 74: REV is used to modify stored information in the event of rate changes or other modifications by the telephone company or the numeral "9".

Key 72: TOT also serves two functions: as a cursor, each depression will permit a graphic symbol to move to the right when viewed from display Window 50 and as a totaler causes the display 52 to indicate total cost. The floating cursor will assist the user in quickly locating any character in the display 50 that may require a change or revision.

The remaining keys are single function keys.

ADL is the Automatic Dial key which permits the user to enter a list of most often called numbers into memory.

Key 76: STO is used to store any group of characters appearing in window 50 of the display.

Key 78: CLR is used to Clear all data from Window 50 when the unit is in the program mode. In the run mode, Window 50 will clear when the receiver is lifted from the telephone cradle.

Key 80: PROG when followed by a three digit access code, a depression of this key will place the device in the program mode, which then makes it possible to enter new data or revise any information stored in memory. To return the device to the run mode, the user will depress the PROG key 80, followed by STO, key 76.

Keys 82 and 83: enter numerals "8" and "0" respectively and are the other remaining keys.

There are a multiplicity of models of the invention, available with diferent capabilities for programming. The fully automated/programmable model may be a device with EPROM inserted or data supplied by MODEM from an outside central data base wherein the EPROM already contains telephone rate information relevant to the user's telephone exchange and area code number. With the entry of five digits once by the user, programming is completed to the extent that the cost of all local and primary calls will be computed automatically. The manually set/programmable model is a device which the user programs by gathering and entering information from the user's telephone directory. Once the information is entered into memory the user does not need to re-enter this information unless there is a rate change. In both the fully automated and manually-set models, there are several operations that must be entered when the instant invention is first installed, as inserting an access code and setting the clock and calendar functions. Both models are factory pre-set with a three digit access number "100". The user may change this number to a three digit number known only to himself. This prevents others from gaining access to memory and will also protect the stored data from accidental erasure. When first setting the device, the user must first recall the pre-set number "100" and then substitute a new number of his own, after which memory can only be accessed if the new access code is entered. This is accomplished by depressing, in order: PROG key 80, the old three digit access code "100", the new three digit access code and the STO key 76. To set the calendar the user depresses: DATE key 56, two digit month code, one digit day of the week code, two digit date code, two digit year code, and STO key 76. To set the time the user depresses: TIME key 58, four digit code for the time, one digit code for AM or PM and STO key 76. This completes the portion of the programming common to ALL models.

The fully automated model requires the following programming: setting for local/primary area by depressing SVC key 60, three digit telephone exchange code, two digit minute code, and the STO key 76, setting for TOLL calls by depressing TOLL key 68, three digit area code, three digit telephone exchange code, two digit minute code, three digit rate for the first unit of charge, three digit rate additional units of charge, three digit percent of rate reduction for evening discount rate, three digit rate reduction for night-discount rate code and the STO key 76. The fully automated model is now completely programmed. All of the local billing information is contained in the EPROM.

The manually set model requires the following programming: if the user has flat rate service including free calls the user will program all of the free local calls listed in his local telephone directory, by depressing PRIM key 62, two digit area zone number code, three digit free exchanges and STO key 76. To set for local-/extended area primary calls, excepting free local calls as described, the user depresses ZONE key 64, two digit user zone number code, three digit primary call area zones and STO key 76. This process will extend to all zones and exchanges within the local/extended primary calling area. To set local rates, the user must enter the rates associated with each zone by depressing RATE key 66, two digit primary area zone code, two digit minute code, three digit cost-per-first-minute code, three digit cost-per-minute-overtime code, three digit percentage evening-discount rate code, three digit percentage night-discount code and STO key 76. This process is extended to all zones with the local/extended primary area. To set toll calls refer to the process described for the fully automated model. To secure the memory depress the PROG key 80 followed by the STO key 76. All models have provision for revising and editing the memory. To determine the cost of a local call before the completion of dialing the user enters the first three digits of the telephone number and the cost of the first minute will appear in the window 52. To determine the cost of a toll call before the completion of a call enter the first six digits of the telephone number (area code and exchange) and the cost of the first minute will appear in window 52. To determine the cost of a call still in progress observe the running total displayed in window 52. To determine the cost of all calls made on that telephone from the first of the present month including the present day and the cost of all calls made the present day depress the TOT key 72 and both costs will appear. To determine the length of time of a conversation in progress, and the total length of time spent on the telephone from the first moment of the day, observe both elapsed times displayed at window 54. In this situation windows 52, and 54 will be flashing alternate information, which may be easily distinguished by the user.

The device may be used as an automatic dialer. To program a number into memory depress the PROG key 80, the three digit access code plus STO. Then the ADL key 74, followed by a two digit code, a three digit area code if the number is a toll call, seven digit telephone number, and the STO key 76.

The device contains a locking provision to prevent unauthorized users from making outside telephone calls. To lock the device depress PROG key 80, three digit user access code, the digits "000" and the STO key 76. To unlock the phone depress PROG key 80, three digit user access code, the digits 999, and STO key 76.

It should be further realized that the instant invention can be programmed in a multiplicity of ways determined by the computer operating system and associated software. The various programming modes can exist simultaneously and obviously are to be compatible with each other. Examples thus cited are illustrative only and as different rate structures by various telephone companies are initiated, appropriate changes in the software used in this device may be made by the user and/or manufacture.

There is an appendix at the end of this specification with specific examples further illustrating how some typical entries are to be made on the device.

Figure 4:
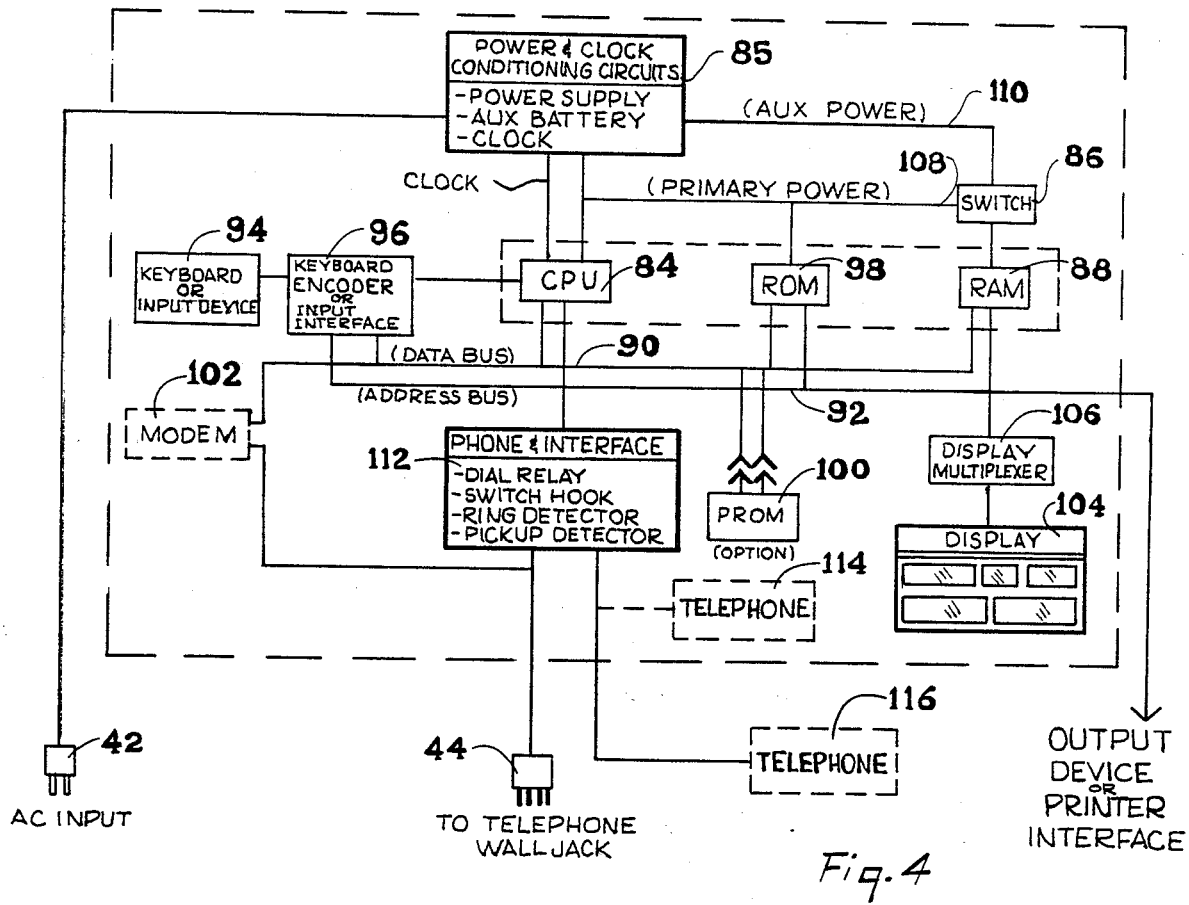
FIG. 4 is a simplified electronic block diagram showing the major components of the invention.

FIG. 4 is a simplified block diagram of the invention. Power and Clock conditioning circuits 85 consist of a power supply to power the instant invention, a rechargeable battery supply to back up the volatile memory in case of power failure and clock circuit necessary to the operation of the central processing unit 84 herein described as CPU. A switch 86 is provided in order to change the power supply to the random access memory, herein described as RAM 88 from its normal primary power 108 to battery powered auxiliary power 110 under conditions of power failure. The CPU 84 receives and transmits information via its data bus 90 and selects data reception or transmission according to selected input, output or storage devices by a signal transmitted through the address bus 92. Input to the CPU may be by: keyboard 94 with associated keyboard encoder 96; by a read only memory, herein described as ROM 98 which contains the permanent operating system information; a random access memory, herein described as RAM 88 which contains user programmed data; a programmable read only memory, herein described as PROM 100, or a MODEM 102. Output of the CPU 84 may be directed to RAM 88, MODEM 102, or display 104 via display multiplexer 106. The input and output configurations described are meant to be illustrative since it is understood that many other input/output devices may be used including voice synthesis and recognition, printers, CRT devices and many others. The telephone interface 112 includes a ring detector and a pickup detector for timing phone calls, a dial relay and switch hook. The invention is shown in two configurations with an internally connected phone represented in dotted line 114 and an externally connected phone represented in dotted line 116.

Figure 5:
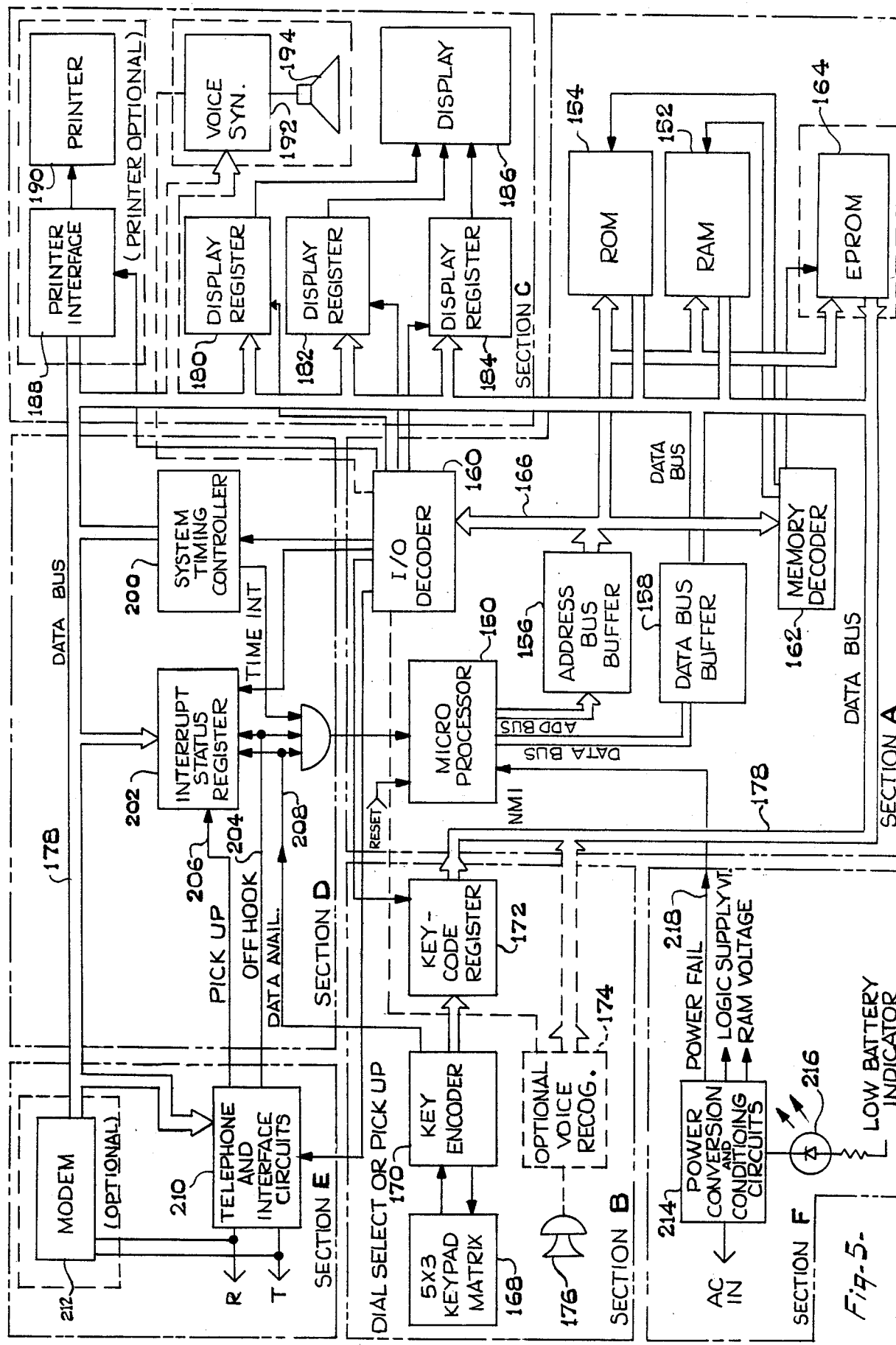
FIG. 5 is a detailed block diagram of the invention.

FIG. 5 is a detailed block diagram of the invention. Each circuit is described and typical IC chips are referenced. Section A contains: the microprocessor 150, an Zilog Z80A; random access memory (RAM) 152, a T.I. #4016-20; a read only memory (ROM) 154, a T.I. #4732; an address bus buffer 156, type 74LS244; data bus buffer 158, type 74LS245; I/O decoder 160, type 74LS42; memory decoder 162, type 74LS138; and; an optional EPROM 164, Motorola #2716.

The ROM 154 contains the permanent operating systems instructions for the CPU 150. Also stored in this memory are fixed data that do not change with user programming. The RAM 152 is the working memory. All information entered by the user is stored here. The EPROM 164 is preprogrammed at the factory with the area code, exchange, zone and rate information for a particular area code and is used in the automatic unit only. The address bus buffer 156 holds address information in storage on a first-in-first-out basis to match the information needs of the CPU 150. The data bus buffer 158 also holds data on a first-in-first-out basis, to match the information needs of the CPU 150. The I/O decoder 160 directs input and output to the various I/O devices according to commands received from the CPU 150 via the address bus buffer 156 and the address bus 166. The memory decoder 162 selects from ROM 154, RAM 152 or EPROM 164 according to instructions received from the CPU 150 via the address bus buffer 156 and address bus 166.

Section B contains; a 5×3 keypad matrix 168; a key encoder 170 and keycode register 172, both contained on a single 74C922 chip; and optional voice recognition circuitry 174 and microphone 176.

The keyboard 168 is of a matrix encoded type. The rows and columns of the keyboard matrix are connected to a keyboard encoder 170. The encoder 170 continually scans the rows and columns of the key matrix and detects any key closure. This availability of data is communicated to the microprocessor 150 and appropriate action is taken. The key code register 172 stores the encoded information from the key encoder 170 for transmittal onto the data bus 178. Optional voice recognition circuit 174 and associated microphone 176 can also output data onto data bus 178.

Section C contains the display section and contains: display registers 180, 182 and 184, all type 75LS374; display 186, which may be LCD, LED, flourescent or any other type; optional printer interface 188 with associated printer 190, and optional voice synthesis circuit 192 with associated speaker 194.

The display section consists of display registers 180, 182 and 184 which are latching. The information to be displayed is written into the latch and held there until updated by new information. In order to gain the user's attention data is flashed on and off the display. Data is transmitted to the display registers 180, 182 and 184 along the data bus 178 and the appropriate display is selected by the microprocessor 150 via the I/O decoder 160.

Section D contains the system timing controller 200 an AMD 9513 and an interrupt status register 202 type 74LS374.

The system timing controller 200 generates the timing signals to control the timing functions in the system. One interval timer is used to time the duration of a telephone conversation. Also, the time of day is generated and maintained by the timing controller. The micro processor 150 can interrogate the timing controller at any instant to find out the time. Additionally, when the micro processor 150 is exclusively attending to clock functions, the timing controller 200 generates interrupts to alert the micro processor 150 to update the time on display 186. In addition, the timing controller 200 will generate the pulse train required to pulse dial a number when pulsing is used for the phone dialing. The micro processor 150 communicates with the timing controller 200 by addressing the controller 200 as an input/output device occupying a logical input/output address. When addressed by the microprocessor 150, that status of the key signals such as off hook 204, pick up 206, keypad data available 208, etc. can be read into the microprocessor 150 for further processing.

Section E contains telephone and interface circuits 210 and an optional MODEM 212. The circuits in the telephone and interface circuits 210 have an output status which indicates when a dialed party has picked up the receiver. The circuit detects the normal click sound that is generated when a dialed party has picked up. An alternate method which consists of monitoring the ring signal which consists of a train of ring pulses in the phone circuit can also be used. In this case, an interval timer is initiated after dialing is completed. This timer is reset whenever the ring pulse is detected and then restarted again. If no ringing pulse is detected after a given interval and at least one ringing interval has occurred, then a successful pickup is assumed. The off hook signal 204 is used to signal to the microprocessor 150 that the phone is in the process of being used. Thus, the variables and timer information required to time and calculate the cost of a call can be set up prior to actual dialing of numbers. The optional MODEM 212 may be used to input information via the phone line to program the RAM 152 with information on rate structure operating system, or other data from an outside data base.

Section F contains power conversion and conditioning circuits 214 and low battery indicator 216.

RAM 152 is protected by battery backup. If the 5 volt output DC power to the unit begins to dip below 5 volts, indicating a loss of power, the 4.5 volt battery is automatically switched to power RAM 152. Low battery indicator 216, an LED, indicates this condition. In order to protect the RAM 152 from being overwritten with spurious data, a power fail signal 218 is used to interrupt the microprocessor 150 through its non-maskable interrupt (NMI) line 218. On receiving this interrupt, the micro processor 150 can deselect the RAM 152 in preparation for a power failure.

Figure 6:
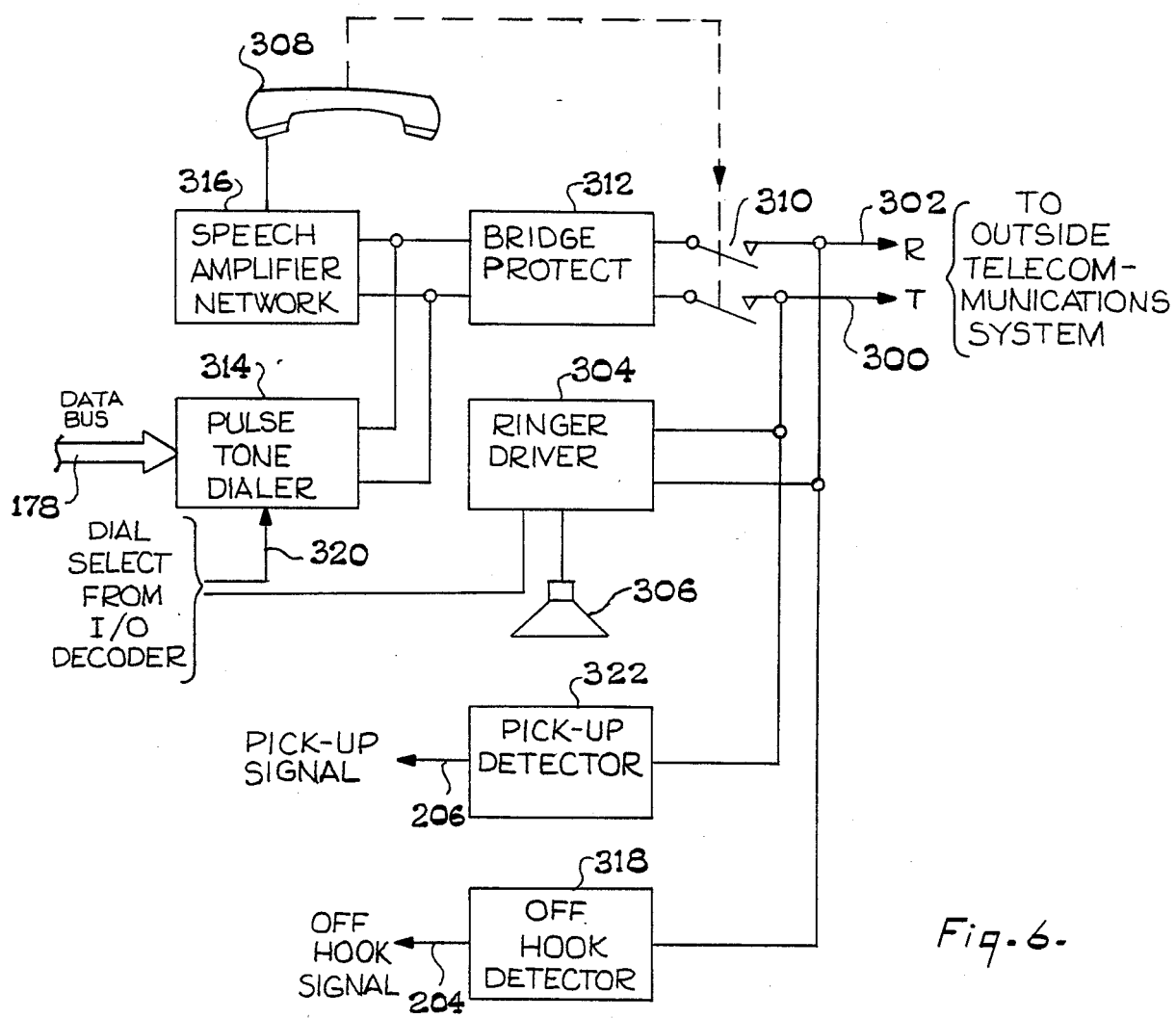
FIG. 6 is a detailed block diagram of the Telephone and Interface Circuits which appear in FIGS. 4 and 5.

FIG. 6 is a detailed block diagram of the previously mentioned telephone and interface circuits, numeral 210 of FIG. 5. The device is connected to the outside telephone line through tip "T" 300 and ring "R" 302 terminals. When there is an incoming call a ringing signal appears at the input the ringer driver 304, which causes transducer 306 to emit an alert signal. When the handset is lifted off its cradle, hook switch 310 is closed connecting the handset 308, through speech amplifier network 316, and bridge protect 312 and hook switch 310 to the tip 300 and ring 302 terminal of the device. When it is desired to make an outgoing call the I/O decoder, numeral 160 in FIG. 5 selects the pulse/tone dialer 314 by means of line 320. The actual number to be called exits the keycode register, numeral 172 in FIG. 5 and enters the pulse dialer 314 via data bus 178 and dials out via bridge protect 312, hook switch 310 and tip 300 and ring 302. When the hook switch 310 is closed by the removal of handset 308 the off hook detector 318 sends an off hook signal 204 to the interrupt status register, numeral 202 in FIG. 5. When the party being called picks up the phone a pick-up signal is detected by pick-up detector 322, and sends a pick-up signal 206 to interrupt status register, numeral 202 in FIG. 5.

Figure 7:
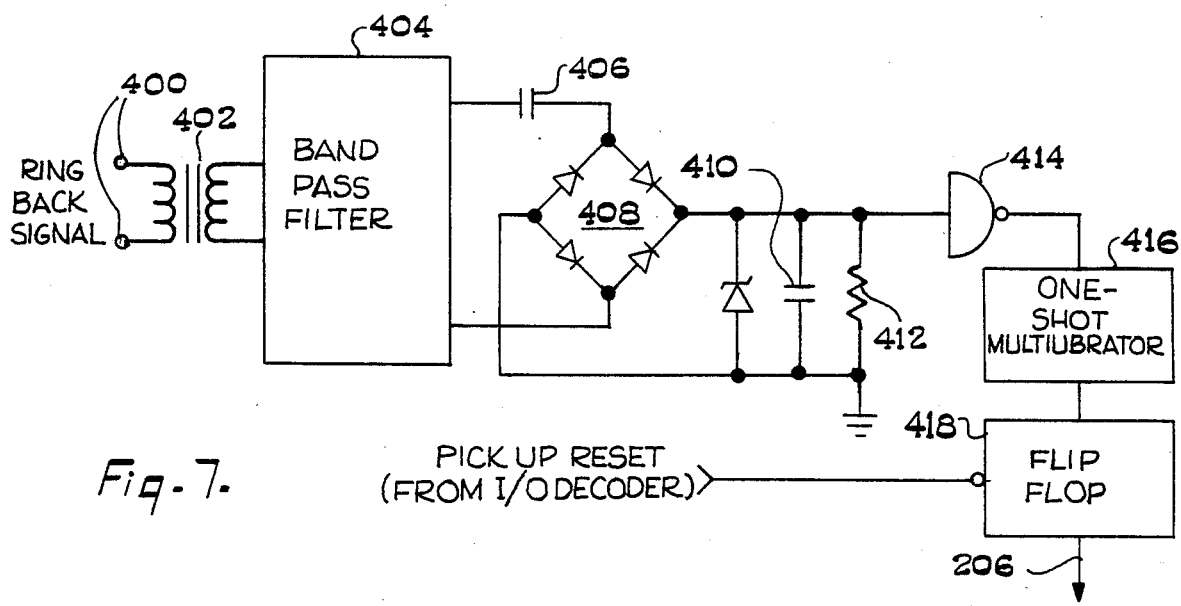
FIG. 7 is a block diagram showing further details of the pick-up-detection circuits which appear in FIG. 6.

FIG. 7 is a more detailed diagram illustrating the pick-up-detection circuit operation. In order to detect a pick-up, the ring back signal 400 is used. The ring back signal is sent back to the originating phone (the instant invention) by the central office to indicate that the called party's phone is ringing.

The ring back signal passes through a matching transformer 402, before being selectively filtered by the band pass filter 404. The signal is then passed through a blocking capacitor 406 to remove any DC components in the signal.

The resulting signal is then rectified by a diode bridge 408. During ring back, which occurs in bursts, capacitor 410 charges up at a an exponential rate depending on the RC time constant essentially determined by the parallel combination of capacitor 410, and resistor 412. This RC time constant is chosen such that during the ring back interval the voltage at $V_r$ with respect to ground is high enough to reach the threshold of the Schmit Trigger Device 414, and subsequently fire the One-Shot Multivibrator 416.

The One-Shot Multivibrator then sets the pick-up flip flop 418. The micro-processor 150 after initiating a call can then sample the state of flip flop 418, the pick-up time. If it is set, it then resets it. The micro-processor can then wait a suitable time and check to see if the flip flop is set again. After successive checks at the proper intervals, the micro-processor can determine if pick-up has occurred and initiate accordingly the next correct process.

Another feature of the instant invention is that the output of pulse/tone dialer, either tones or pulses, may be selected by the user to match the requirement of the telephone companies.

This is accomplished by positioning switch 35 in FIGS. 1 and 2 respectively which are shown in a cut a way view in dots to illustrate that they are typically located underneath the device in an out of the way location.

It is to be further understood that while the terms, ROM, PROM and EPROM are used through out this specification that any memory device consistent with good engineering practice are acceptable and that these terms are not to be considered as limitations upon the choice of memory device chosen.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

APPENDIX

This appendix is intended as a guide to understanding the general way in which some typical embodiments of the invention will function by way of illustrating some specific examples of features of the invention. There are obviously many embodiments to numerous in scope to be illustrated in this text and these specific illustrations are not be construed as limitations upon the broader scope of the invention.

GENERAL FEATURES

This invention relates to an improvement to computer-type telephone metering sets which function to monitor, meter and display the cost of making telephone calls at any of four periods of time:

(1) before the user completes "dialing" his number;
(2) the cumulative cost of that call while the user is in conversation; and
(3) the total cost of all calls made from that telephone up to that moment of the day, and
(4) from the first day of the month.

Whereas, state of the art devices can not be programmed by the user and must rely on floppy discs, magnetic tapes, rate modules, and other expensive peripherals, this invention requires none of these to make it operable, as it is fully programmable by the user and permits the user to enter rate, area code, exchange number and the type of service he has contracted with his telephone company, all in a matter of minutes.

A further objective of this invention is for the user to store pertinent information and to revise said information at will, in the event there are rate changes from the telephone company, or in the event the user relocates to another part of the country. Some other features include:

(4) a clock and calendar display;
(5) an automatic dialing feature for quick access to common numbers;
(6) an access code known only to the user, which protects stored date from accidental erasure, or tampering from others;
(7) a security code, which "locks" the telephone and restricts the telephone to incoming calls only;
(8) an elapsed time indicator that tells the user the time spent in conversation, and the cumulative time spent on that phone form the first moment of the day; and, (9) the ability to check the accuracy of his intended number, and the accuracy of all programmed information as it is entered on the keyboard.

Housed inside a standard telephone set, or inside a slimline desk-top module, which acts as a telephone accessory, the invention contains a microprocessor, a keyboard and a digital display which contain the following features:

(1) May be offered in at least three basic styles:
  (a) Fully Automated/User Programmable Model;
  (b) Manually Set/User Programmable Model; and
  (c) Commercial/User Programmable Model.

All models will contain:

(2) Program Access Provisions which act as a safeguard against tampering or accidental erasure of stored information;

(3) Telephone Locking Provisions which permits the user to "lock" his phone thereby limiting its use to incoming calls only.

(4) User Programmable Provisions which permit the user to enter or revise at will, all information to make this invention operable.

(5) Automatic Dialing Provisions which permits automatic dialing of most commonly called numbers by the simple depression of one key.

(6) On-Line Charge Provisions which permits the user to alter any part of stored memory, in the event of changes from the telephone company.

(7) Local and Toll Cost Data will tell the user the cost of his call.

(8) Clock and Calendar Provisions have been incorporated.

(9) Rechargeable Battery Provisions are incorporated to protect memory against power failure. NOTE: used only for manually set and commercial models.

(10) A keyboard which contains at least fifteen keys and makes the invention operable.

(11) A Digital Display containing five windows, which tell the user (see FIG. 3).

Window 46: TIME OF DAY, AM OR PM functions;

Window 48: DAY AND DATE and the condition of the BATTERY:

Window 50: THE NUMBER DIALED will be displayed to alert the user if he has dialed the wrong number; ALL DATA ENTRY will be displayed to monitor the accuracy of all of his entries prior to strong his information;

Window 52: INITIAL COST DATA will convey the cost for the first one minute of conversation before he completes "dialing" his intended number, total cost while in conversation, and total cost from the first moment of the day and from the first day of the month;

Window 54: ELAPSED TIME will convey how long (minutes/seconds), the user has been on the line; and after completing his call the total time spent on that line from the very beginning of the day.

TABLES

Table 1 is a complete table of exchanges and zones taken from the Suffolk County, New York telephone directory, which is summarized in Table 5.

Table 2 is a table of zone numbers taken from the Suffolk local telephone directory. Each zone contains a series of exchange numbers under the column "FROM EXCHANGE" and denotes where a call is originating. The exchange numbers listed under "TO 'PRIMARY AREA' EXCHANGE" denotes the exchange that is being called.

Table 3 is an extension of Table 2.

Table 4 is an extension of Table 3.

Table 5 is a summary matrix of the tables found under Table 1 through Table 4.

Table 6 is a matrix of where a call is originating ("FROM USER ZONE"), to the zone that is being called ("CALLING ZONE") and cross references a series of letters which denote a "RATE CODE" (which tells the "rates"), when a call is placed from one zone to another. This information was taken from the Suffolk County telephone directory.

Table 7 taken from the Suffolk County local telephone directory, this table identifies the relationship between the "RATE CODES" (Table 6) and the actual rates charged by the telephone company between each zone.

Table 8 is the flow and sequence of operation for programming all three models.

TERMS AND DEFINITIONS

The following terms and definitions are taken from the Suffolk County, New York telephone directory and are given as reference as these terms are often used to explain the methods of operation of this invention:

THE TYPES OF CALLS: There are two: Primary Area and Toll Calls.

(1) PRIMARY AREA CALLS: are local calls made by the user to his own exchange or nearby exchanges, providing they are within his assigned primary exchange area, and are within his local "area code" number. For example, all numbers listed under Tables 1 through 5 are known as "Primary Area Exchange" numbers. "Primary Area" calls is a generic term and has two subdivisions:

(a) LOCAL CALLS: are generally known as calls which the user makes to his "local" area and are free of charge; providing the suer has contracted a "Flat Rate Service" with his telephone company.

(b) EXTENDED AREA CALLS: are all calls made within the "Primary Area" and are those which are charged to the user. These calls may be within the user's local area, or may be to exchanges in nearby areas and will always be calls which are being charged. For Example, if the user has not opted for "Flat Rate Service" he will be charged for all calls made, whether "local" or to an "extended area".

(2) TOLL CALLS: are calls made outside the user's local primary area; that is, they are calls made to another area code. These calls have a much higher rate and are generally billed to the user as an itemized statement in his monthly telephone bill.

TYPES OF RATE SERVICE: There are basically four plans offered to the user:

(1) BASIC BUDGET: This plan has no monthly allowance for outgoing local (free) calls and is designed for residence customers who need a phone mostly to receive calls, or who make few outgoing calls. These customers may call any number listed in his designated primary area or "block" shown in Tables 2 through Table 4 and talk as long as he wishes. However, for calls made within his primary area block there is a flat charge for the first one minute, with no charges for overtime. Calls made outside his primary area block and placed to other primary area districts, are treated as "extended area" calls and are timed from the first minute and additional charges for overtime.

(2) TIMED SERVICE: All local calls, both primary and extended area calls are timed for the first five minutes with additional charges for overtime.

(3) UNTIMED SERVICE: The user can call any number listed in his immediate primary area and talk as long as he wishes for a flat rate. Calls outside his designated area are timed from the first minute and additional charges for overtime.

(4) FLAT RATES SERVICE: Is the least expensive in many cases permits the user to make any number of calls of any length within his immediate or designated area. He can call any number listed in this area and talk as long as he wishes, at no charge to him. Calls made outside his immediate area and into other primary areas will be timed from the first minute with additional charges for overtime.

MINUTE CODE: Is a term frequently used in this text and is not a term used by the telephone company. The Minute Code is a two digit number which helps identify, in part, the type of service the user has contracted with the telephone company. The first digit identifies the number of minutes involved in his "initial charge" or call; while the second digit identifies the number of minutes involved when being charged for overtime. For example: a Minute Code of "11" indicates that billing is for the first one minute of conversation, and overtime for each additional one minute. A Minute Code of "51" will indicate charges for the first five minutes and overtime charges for each additional one minute, etc. Therefore, the Minute Code is determined by the type of service offered to the user:

FIG. 2 is another method of housing the invention and contains a display 30 and keyboard 28 having identical functions as those incorporated under FIG. 1. In this illustration, a standard telephone set 24 is seated on top of a plastic housing 36 which has a rectangular shape and a sloping front panel having suitable openings which permit visual contact to the display 30 and finger access to the keyboard 28. The housing 26 is made form a high impact plastic material and may be formed to any style, shape or color, and includes an AC line cord 42 and a telephone wall plug 44 emerging from the rear.

Both models in FIG. 1 and FIG. 2 will have almost identical circuits with the exception that the model shown in FIG. 1 is integrated in a standard telephone, while the model shown in FIG. 2 is used as an accessory to the user's telephone and when placed in a series with the said telephone, is able to monitor "real time" data and compute its own rate information.

Referring once again to FIG. 1 and FIG. 2, each model will contain a removable cover which gives the user access to a spare printed circuit connector socket which is used to convert a "manually set" model to an "automatic" model by merely inserting a factory programmed "PROM" module 18 and 34 into the socket. The ability to convert a manually set unit into a fully automatic unit or vice versa, is available to every user by simply purchasing a special "PROM" (designed for his area code), from his local distributor.

FIG. 3 is a detailed view of the display and keyboard and may be common to both the FIG. 1 and FIG. 2 designs. Specifically, the display is viewed through an attractive bezel which has a number of rectangular openings which act to partition information and focuses the user's eye to any of the following bits of informa-

| TYPE OF SERVICE | WHEN CALLING AREA | INITIAL PERIOD | OVER TIME PERIOD | MINUTE CODE | FREE CALLS |
| --- | --- | --- | --- | --- | --- |
| Basic Budget | Immediate Area | 1 Min. | Free | "10" | No |
|  | Extended Area | 1 Min. | 1 Min. | "11" | No |
| Timed | Immediate Area | 5 Min. | 1 Min. | "51" | No |
|  | Extended Area | 5 Min. | 1 Min. | "51" | No |
| Untimed | Immediate Area | 1 Min. | 1 Min. | "11" | No |
|  | Extended Area | 1 Min. | 1 Min. | "11" | No |
| Flat Rate | Immediate Area | Free | Free | "00" | Yes |
|  | Extended Area | 1 Min. | 1 Min. | "11" | No |
| — | Toll Calls | 1 Min. | 1 Min. | "11" | No |

In the event the telephone company should change its initial and overtime billing period (minutes), the Minute Code will change accordingly. NOTE: When programming long distance or toll calls a "Minute Code" of "11" will be used.

CONSTRUCTION

Although not limited to the two styles offered in this text, the invention presented herein may be housed in either a standard telephone set, FIG. 1, or as a slimline desk-top module, FIG. 2 which when sold as an accessory permits the invention to interface directly with the user's telephone.

FIG. 1 illustrates the invention incorporated as an integral part of a standard telephone set 10 which contains a keyboard 16 having fifteen keys and a digital display 22 which permits the user to monitor the time of day, day of the month, elapsed time indivator, the cost of making a telephone call, and the accuracy of his data entry.

tion.

Window 46: TIME OF DAY, AM or PM functions.

Window 48: DAY AND DATE and the condition of the BATTERY.

Window 50: Is the DATA ENTRY window. The NUMBER DIALED will appear to alert the user if he has misdialed. PROGRAMMED DATA will be display for the user to monitor the accuracy of all his entries prior to storing into memory.

Window 52: INITIAL COST DATA will tell the user the initial charge of his call before he "completes dialing" his intended number.

CURRENT COST DATA will convey the cumulative cost of his call while the user is still in conversation.

TOTAL COST DATA will convey to the user the total cost of all calls made from that telephone, up to that moment of the day and from the first day of the month, simultaneously.

NOTE: Data displayed in Window 52 will pulsate in vivid color, at one second intervals to attract the user's attention.

Window 54: ELAPSED TIME DATA will convey how long (minutes/seconds) the user has been on the line. After the call has been completed, this total is added to any prior sub-totals for that day and displayed as a TOTAL TIME spent on the phone for that day.

Referring once again to FIG. 3, a keyboard having fifteen keys suitably marked to convey their function:

Key 56: DATE is used to enter "Date" information, and the number "1".

Key 58: TIME is used to enter "Time" information, and the number "2".

Key 60: SVC is used to enter "Service and Rate" information such as the type of service contracted with the telephone company, the user's exchange number and the rates for his area and the number "3".

Key 62: PRIM is used to enter all "Primary Area" exchange numbers and the number "4".

Key 64: ZONE is used to enter specific "Zone" numbers listed in the user's primary calling area and the number "5".

Key 66: RATE is used to enter "Rates" from the user's zone to other zones listed in his primary calling area and the number "6".

Key 68: TOLL is used to enter Long Distance numbers and rates, and the number "7".

Key 74: ADL is the "Automatic Dial" key which permits the user to enter a list of most often called numbers into memory. When depressed, followed by a two digit number, the device will automatically dial the desired number.

*Key 72: TOT serves tow functions: as a CURSOR, each depression will permit a graphic signal to move to the right when viewed from display window 50. The "floating cursor" will assist the user in quickly locating any character in the display that may require a change or revision. As a TOT, a simple depression of this key will convey the total time spent talking for that day, and the total cost accumulated from the first moment of the day of the month.

Key 70: REV is used to modify stored information in the event of rate changes or other modifications made by the telephone company.

*Key 76: STO is used to store any group of characters appearing in Window 50 of the display.

*Key 78: CLR is used to "clear" all data from Window 50 when the unit is in the "program" mode. In the "run" mode, Window 50 will "clear" when the receiver is placed back on the telephone.

*Key 80: PROG when followed by a three digit "access code", a depression of this key will place the device in the "program" mode, which then makes it possible to enter new data or revise any information stored in memory. To return the device to the "run" mode, the user will depress the PROG key 80, followed by STO, key 76.

Key 82: "8" is just one of ten other keys which have indices imprinted ranging from "1" to "0" and are used to enter numerical data into the memory, and used to dial outside.

NOTE: All of the above keys are operable in both the "program" and "run" modes. However, all keys marked with an asterisk (*) are operable in the "program" mode only.

Referring once again to FIG. 1, FIG. 2 and FIG. 3, a housing, whether as an integral part of a standard telephone set 10 of FIG. 1, or as a rectangular body presented as 26 in FIG. 2 which contains provisional space within its interior that will accommodate:

BATTERY: which will secure all stored information in the event of a power failure. When the battery needs replacement, the characters "00" will flash in Window 48 of the display.

MISCELLANEOUS COMPONENTS: such as an AC/DC charger and converter and other suitable connecting parts, such as standard telephone plugs and jacks, a relay, and other hardware which holds the assembly together and makes it operable.

GENERAL NOTES

In order to demonstrate the operation of this invention, it is necessary to create a fictitious example that will assume that the user has purchased this invention, has taken it home, and now is ready to use it. For the purpose of this demonstration, we will assume that the user is:

(a) a resident of Suffolk County, New York, has an area code of "516", a telephone exchange number beginning with "549" and has contracted a "Flat Rate" service with his telephone company. Referring to the Minute Code table previously listed, his Minute Code is "11".

(b) The user wishes to program three (3) long distance numbers into his machine: (1) a call to Boston, (2) a call to Los Angeles, (3) a call to Washington, D.C. and (c) he has elected to install his telephone on July 23, 1984, a Friday at 12:40 p.m. and will be making his first call to (516) 324-3086.

Hereafter, all references to programming this invention will be based on the above example.

In addition, and for the benefit of the reader, Tables 1 through Table 7 is information which was obtained from the Suffolk County, New York local telephone directory and is available (in similar form) to all telephone users throughout the country. The information contained in these tables may be preprogrammed at the factory level, as in the case of a fully automated version of the invention, or may be programmed by the user himself, as in the case of a user-set programmable device.

Therefore, in order to satisfy both the fully automated model and the user-set model, this text will address the methods of programming the device for the three models: the fully automated model, the manually set model and the commercial model.

HOW TO PROGRAM THE INVENTION (Refer also to Table 8)

This text has been written to show the methods used to program all three basic model, and is using the example listed under "GENERAL NOTES" as a basis of information. In effect:

THE FULLY AUTOMATED/PROGRAMMABLE MODEL: is a device fully programmed at the factory level to contain all of the information listed under Tables 1 through Table 7. With the entry of only five (5) digits, all local and primary calls have been fully programmed. The device is now ready for use!

THE MANUALLY-SET/PROGRAMMABLE MODEL: is a device which the user programs for himself, select information found under Tables 1 through Table 7. The gathering of this information is as simple as looking into his local telephone directory. Once certain parts of this information has been entered once, the device is now ready for use!

In all three models, there are several operations that must be entered for the first time, such as inserting the "access code" and setting his "clock and calendar" functions.

This is done as follows:

NONRECURRING PROGRAM OPERATIONS (Common to all models)

GAINING ACCESS TO MEMORY: All models are factory-set with a three digit access number "100". The user will be encouraged to change this number with a new three digit number known only to himself. This prevents others from gaining access to memory and will also protect the stored data form accidental erasure.

When first setting his device, the user must first recall the factory-set number "100" and then substitute a number of his own, after which, access to memory can only be made if the new access code number is entered:

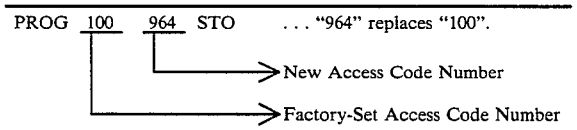

TO SET THE CLOCK AND CALENDAR: In the example given under "GENERAL NOTES" the user is setting his device on Friday, July 23, 1983 at 12:40 p.m.

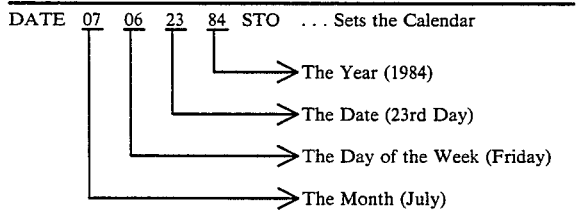

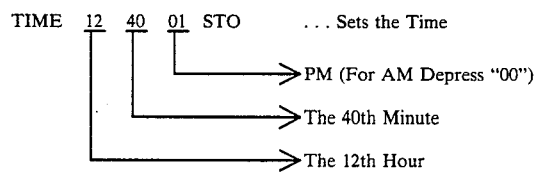

NOTE: COMMON NONRECURRING ENTRIES HAVE NOW BEEN COMPLETED!

PROGRAMMING THE FULLY AUTOMATED MODEL

TO SET FOR LOCAL/PRIMARY AREA: To make the device operable for any local or primary calling area, the user enters only five (5) digits:

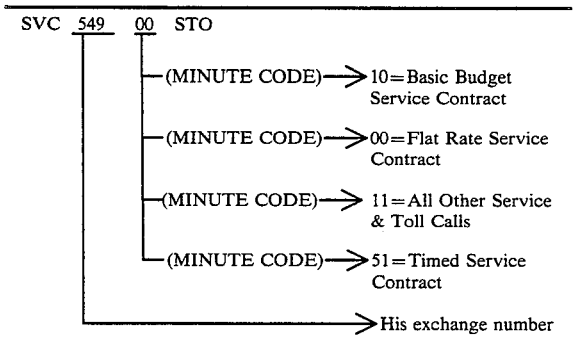

NOTE: THE DEVICE IS NOW READY FOR LOCAL AREA USE!

TO SET "TOLL" CALLS: After selecting a given number of long distance calls, the user must refer to his telephone directory, or may ask his operator for assistance for determining the rates for each long distance call, and the prevailing discounts, if any. The user will then enter the area code and exchange, and must enter a Minute Code of "11", which is the standard minute code for all long distance and toll calls.

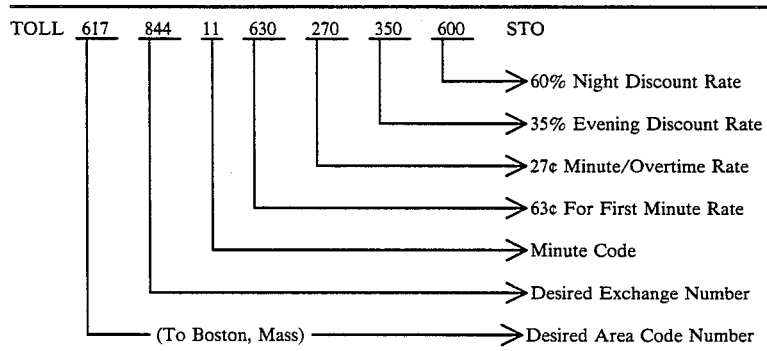

```
TOLL  202  344  11  570  220  350  600     STO
       └──(To Washington, D.C.)
```

SECURING MEMORY: May be performed by depressing: PROG followed by STO
NOTE: THE DEVICE IS NOW READY FOR LOCAL AND LONG DISTANCE USE! THERE IS NO FURTHER PROGRAMMING REQUIRED!

PROGRAMMING THE MANUALLY-SET MODEL

TO SET FOR LOCAL "FREE" CALLS: NOTE: This operation is used only if the user has contracted a "Flat Rate" service plan with his telephone company. If he has, the user must refer to his local telephone directory and determine the zone he is in by referring to a table similar to table 2, and after finding his exchange number "549", he will proceed to enter all of the exchanges listed in his corresponding "block", which is shown under the column "TO PRIMARY AREA" EXCHANGE.

If he has a "Flat Rate" service contract, entries in Table 2 will tell the computer all of the exchanges which are "free of charge", by entering:

```
ZONE  03  226 242 266 271 321 351 368 421 422  STO
ZONE  03  423 427 462 491 493 499 549 586 587  STO
ZONE  03  549 643 661 667 669 673 754 757 884  STO
ZONE  03  888 893 957
```

The user will now continue to enter zone "4" of Table 5:

```
ZONE  04  224 231 234 265 269 273 277 348 360  STO
ZONE  04  435 440 543 544 581 582 583 665 666  STO
ZONE  04  724 859 968 979                      STO
```

The user will now continue with entries listed for zone 5 until all of the entries remaining in Table 5 have been entered.

TO SET "LOCAL RATES": Referring to tables in his local telephone directory, which is illustrated under Table 6, the user must proceed to enter the rates associated with each zone. If the user is in zone 3, Table 6 tells us that the "Rate Code" when calling an exchange

```
PRIM  03  242  249  261  266  271  293  351  367  368  STO
PRIM  03  420  421  423  427  435  462  491  493  499  STO
PRIM  03  531  543  549  586  595  643  667  673  692  STO
PRIM  03  694  752  754  864                            STO
          │    │    │    │    │    │    │    │
          └────┴────┴────┴────┴────┴────┴────┴──> "Free Calls" (Table 2)
      └──> His Area Zone number
```

NOTE: THE ABOVE OPERATION IS USED ONLY IF THE USER IS ENTITLED TO RECEIVE "FREE CALLS". IF HE IS NOT ENTITLED, THIS OPERATION IS NOT REQUIRED AND THE USER MAY PROCEED TO THE NEXT OPERATION.

TO SET FOR LOCAL/EXTENDED AREA PRIMARY CALLS: Unless otherwise noted in the previous operation, all exchanges entered in this operation are "charged" to the user. To enter, the user must refer to a summary matrix of all exchanges listed in his local area (Table 5), a table of which is supplied with each machine, and will proceed to enter this information as follows:

listed in zone 3 is "C"; to zone 2 is "B"; to zone 7 is "E", etc.

The lettered "Rate Codes" listed in the local telephone directory are nothing more than a coded letter which signifies certain rates, usually expressed in dollars, or fraction thereof. In order to give the reader translation of these letter codes to dollars, Table 7 has been compiled to show the relationship of Rate Codes (letters) to actual dollars.

Once the user is made aware that "letter codes" are nothing more than "actual rates". he can proceed to enter his rates in an orderly manner.

Referring to Table 6, the user in our example is calling from zone 3. Therefore, he will begin his entry with:

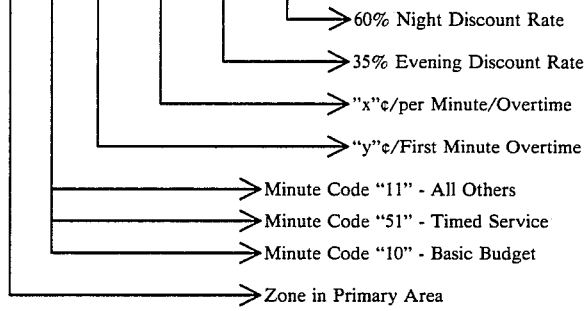

The user will continue his entries until all of the zones listed in Table 6 have been entered in the order in which they are shown.

NOTE: THE DEVICE IS NOW READY FOR LOCAL AREA USE!

TO SET "TOLL" CALLS: Refer to the operation shown under "Setting for Toll Calls" for the fully automated model.

SECURING MEMORY:

PROG followed by STO . . . returns unit to "run" mode.

HOW TO REVISE PROGRAM (BOTH MODELS)

In order to modify the program, the user begins by gaining access to memory:

PROG 964 . . . access code is entered.

After access has been made, the user must depress REV (and depending on the program which is to be revised), must follow with a depression of any one of six (6) keys:
ZONE  TOLL  SVC  PRIM  RATE and the ADL key.

For example, let us assume that the evening discount rate has been reduced by the telephone company from 35% to 20%.

| REV RATE | (03 11 130 350 600) | . . . these numbers will appear in window 50. |
|---|---|---|
| TOT | (_ _ _ 350) | . . . cursor will move to the desired spot. |
| | (_ _ _ 200) | . . . Keying in "200" changes the discount for zone "3" from 35% to 20%. |
| TOT | (04 11 130 350 600) | . . . continuous depressions of the cursor key brings zone 4 rate information into view. |
| TOT | (_ _ _ 200) | . . . Discount for zone "4" is now changed. |

This operation will be continued until all of the zones listed in the "RATE" memory have been recalled and revised from 35% discount to a 20% discount; after which, the user will depress:

STO which stores "RATES" back to memory. Followed by: PROG STO which returns the unit to the run mode.

NOTE: AT THIS TIME, NO FURTHER REVISION CAN BE MADE UNTIL SUCH TIME AS THE ACCESS CODE IS ENTERED ONCE AGAIN INTO THE MACHINE.

PROGRAMMING THE COMMERCIAL MODEL

To program the commercial model, the user simply places a call to a central computer station and gives the station operator his area code, his exchange number, and the type of service he has contracted with a list of selected long distance numbers he wishes to have entered, specifying the area code and exchange for each long distance call.

The station operator will then ask the user to place his instrument in the "program" mode by depressing PROG followed by his access code 964. The station will then back-load and set (through the integral modem), the instruments clock, calendar, all local exchanges and rate structures, and all long distance calls and rates as were requested by the user. After which, the user returns the machine to the "run" mode by depressing PROG STO.

THE COMMERICAL IS NOW READY FOR USE!

MAKING AN OUTSIDE CALL: After picking up the receiver, the user may dial his number by merely fingering the keyboard. Therefore:

(1) To Determine the cost of a call before he completes his number:
Local Calls: Simply dial the first three digits and observe Window 52 and the cost of the first one minute will appear.
Toll Calls: Depress TOLL followed by the area code and exchange number. Window 52 will display the cost of that call for the first one minute.

(2) To Determine the cost of a call while still in conversation:
Cumulative cost will be displayed in window 52 and the total time spent talking will be displayed in window 54.

(3) To Determine the total cost of all calls made on that telephone:
Simply pick up the receiver and depress TOT key. The total cost up to that moment of the day, and the total cost from the first day of the month will be displayed in Window 52 simultaneously.

(4) To Determine the length of time you have been on the telephone:
Simply observe Window 54.
NOTE: The total time spent talking after the call has been completed will be added to any previous totals for that day and automatically stored to memory. A depression of the TOT key will give the user the total time on that telephone up to that time of day. At the beginning of a new day, the timer will automatically reset to "00:00".

USE OF THE ADL KEY: When entering a list of commonly used telephone numbers into the memory bank for automatic dialing, the user must do the following:

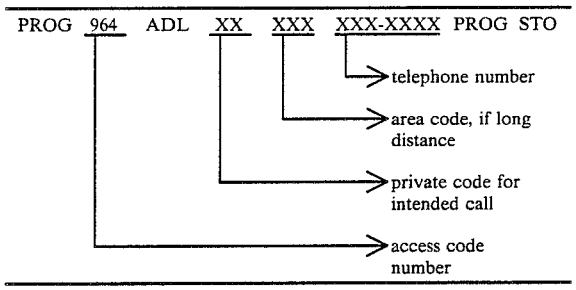

To revise or modify ADL Data: Refer to "HOW TO REVISE PROGRAM"

To dial an ADL number:

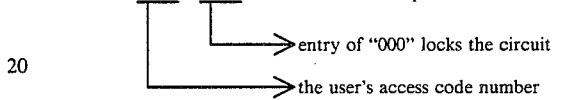

HOW TO LOCK THE TELEPHONE: The invention contains an electronic locking provision that does away with state of the art mechanical locks, which are normally bought as accessory items for rotary type dial telephone sets. In the event the user wishes to lock his telephone so that no one other than himself can make outside calls, the user must depress.

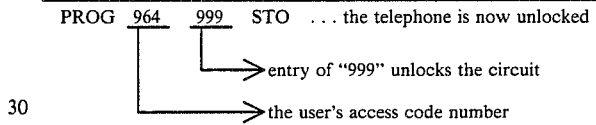

HOW TO UNLOCK THE TELEPHONE

PROG 964 999 STO ... the telephone is now unlocked

→ entry of "999" unlocks the circuit
→ the user's access code number

TABLE 1

| EXC | ZONE | EXC | ZONE | EXC | ZONE | EXC | ZONE | EXC | ZONE | EXC | ZONE | EXC | ZONE | EXC | ZONE |
|---|---|---|---|---|---|---|---|---|---|---|---|---|---|---|---|
| 221 | 2* | 321 | 3A | | | 562 | 1* | 673 | 3 | 758 | 5C | 893 | 3D | | |
| 222 | 1* | 323 | 9 | 444 | 1* | 567 | 5 | 674 | 1* | 759 | 1* | | | | |
| 223 | 1* | 324 | 9 | 448 | 1* | 569 | 1* | 677 | 2* | 764 | 1* | | | | |
| 224 | 4 | 325 | 7 | 451 | 1* | 574 | 1* | 678 | 1* | 765 | 8 | 921 | 1* | | |
| 226 | 3 | 328 | 1* | 462 | 3 | 575 | 2* | 679 | 2* | 767 | 1* | 922 | 2* | | |
| 228 | 1* | 331 | 5 | 466 | 1* | 576 | 2* | 681 | 2* | 775 | 1* | 924 | 6 | | |
| 231 | 4 | 333 | 1* | 467 | 5 | 579 | 2** | 683 | 1* | 781 | 2* | 928 | 5 | | |
| 233 | 5 | 334 | 1* | 472 | 5 | 581 | 4 | 684 | 1* | 785 | 2* | 929 | 6 | | |
| 234 | 4 | 345 | 6 | 473 | 5 | 582 | 4 | 686 | 1* | 789 | 2* | 931 | 1* | | |
| 239 | 1* | 348 | 4 | 475 | 5 | 583 | 4 | 689 | 5G | 791 | 1* | 935 | 1* | | |
| 242 | 3 | 349 | 2* | 477 | 9 | 584 | 5 | 691 | 2* | 794 | 1* | 933 | 1* | | |
| 246 | 1* | 351 | 3 | 481 | 5C | 585 | 5 | 692 | 2* | 795 | 2* | 941 | 5 | | |
| 248 | 1* | 352 | 1* | 482 | 1* | 586 | 3 | 698 | 2* | 796 | 2* | 944 | 1* | | |
| 249 | 2* | 354 | 1* | 483 | 1* | 587 | 3 | | | 798 | 2* | 957 | 3 | | |
| 255 | 1* | 360 | 4 | 484 | 1* | 588 | 5 | | | 799 | 2* | 968 | 4 | | |
| 261 | 3 | 363 | 5 | 485 | 1* | 589 | 5 | 722 | 7 | | | 979 | 4 | | |
| 264 | 2* | 364 | 2* | 486 | 1* | 593 | 1** | 724 | 4 | | | 981 | 5 | | |
| 265 | 4 | 365 | 1* | 487 | 1* | 595 | 3 | 725 | 9 | 821 | 6 | 987 | 5 | | |
| 266 | 3 | 367 | 2* | 488 | 1* | 597 | 5 | 726 | 9 | 822 | 2* | 997 | 1* | | |
| 267 | 9Δ | 368 | 3G | 489 | 1* | 598 | 2* | 727 | 7 | 823 | 1* | | | | |
| 269 | 4 | 369 | 7 | 491 | 3 | 599 | 1* | 728 | 8 | 824 | 1* | | | | |
| 271 | 3 | 371 | 1* | 493 | 3 | | | 731 | 1* | 826 | 2* | | | | |
| 273 | 4 | 374 | 1* | 496 | 2* | | | 732 | 2* | 829 | 1* | | | | |
| 277 | 4 | 378 | 1* | 499 | 3 | 621 | 1* | 733 | 2* | 842 | 2* | | | | |
| 281 | 6 | 379 | 1* | | | 623 | 1* | 734 | 8 | 859 | 4 | | | | |
| 283 | 8 | 399 | 6 | | | 626 | 1* | 735 | 1* | 862 | 5 | | | | |
| 284 | 1* | | | 520 | 2* | 627 | 1* | 736 | 1* | 864 | 4 | | | | |
| 285 | 1* | | | 531 | 2* | 628 | 1* | 737 | 5 | 868 | 1* | | | | |
| 286 | 6 | 420 | 2* | 535 | 1* | 643 | 3 | 741 | 1* | 869 | 1* | | | | |
| 288 | 7 | 421 | 1* | 536 | 1* | 644 | 1* | 742 | 1* | 872 | 1* | | | | |
| 289 | 5 | 422 | 1* | 537 | 9 | 653 | 7 | 744 | 6 | 877 | 1* | | | | |
| 292 | 1* | 423 | 1* | 538 | 1* | 654 | 5 | 746 | 1* | 878 | 6 | | | | |
| 293 | 2** | 427 | 3 | 541 | 2* | 661 | 3 | 747 | 1* | 883 | 1* | | | | |
| 294 | 1* | 431 | 1* | 543 | 4 | 665 | 4 | 749 | 9 | 884 | 3 | | | | |
| 295 | 1* | 432 | 1* | 546 | 1* | 666 | 4 | 751 | 5 | 886 | 1* | | | | |
| 298 | 8 | 433 | 2* | 549 | 3 | 668 | 9 | 752 | 2* | 887 | 1* | | | | |
| 299 | 1* | 435 | 4 | 560 | 1* | 669 | 3 | 754 | 3 | 888 | 2* | | | | |

TABLE 1-continued

| EXC | ZONE | EXC | ZONE | EXC | ZONE | EXC | ZONE | EXC | ZONE | EXC | ZONE | EXC | ZONE |
|-----|------|-----|------|-----|------|-----|------|-----|------|-----|------|-----|------|

AREA EXCHANGES AND ZONES FOR LONG ISLAND

*Zones 1 and 2 are for Nassau County and have been omitted from this specification for clarity purposes.

TABLE 2

| ZONE | FROM EXCHANGE | | | TO "PRIMARY AREA" EXCHANGE |
|------|---|---|---|---|
| 3 | 321 | 422 | 587 | 226 231 242 273 321 422 435 491 586 587 595 643 661 665 666 667 669 859 884 888 893 957 968 |
| | 661 | 669 | | |
| | 242 | 586 | 595 | 231 242 266 271 273 321 351 368 421 422 423 427 435 462 291 493 499 543 549 586 587 595 643 661 665 666 667 669 673 859 864 968 |
| | 667 | | | |
| | 271 | 351 | 421 | 242 249 261 266 271 293 351 367 368 |
| | 423 | 427 | 549 | 420 421 423 427 435 462 491 493 499 531 543 549 586 595 643 667 673 692 694 752 754 757 864 (*) |
| | 673 | | | |
| | 226 | 884 | 888 | 226 249 264 293 321 429 422 491 531 587 598 643 661 669 694 752 842 884 888 893 957 |
| | 893 | 957 | | |
| | 261 | 754 | 757 | 261 266 269 271 351 368 421 423 427 462 293 499 543 544 549 673 754 757 864 |
| | 491 | 643 | | 226 242 249 271 293 321 351 420 421 422 423 427 491 531 549 586 587 595 643 661 667 669 673 694 752 884 888 893 957 |
| | 266 | 368 | 462 | 231 235 242 261 265 266 269 271 273 348 351 360 368 421 423 427 435 440 462 493 499 543 544 549 582 586 595 667 673 724 754 757 864 979 |
| | 493 | 499 | | |
| 4 | 665 | 666 | 859 | 224 231 242 273 277 321 422 435 581 583 586 587 595 661 665 666 667 669 859 968 |
| | 968 | | | |
| | 231 | 273 | 435 | 224 231 234 242 265 266 273 277 321 348 360 368 422 435 440 462 493 499 543 581 582 586 587 595 661 665 666 667 669 724 859 864 968 979 |
| | 234 | 348 | 582 | 224 231 234 265 266 273 277 348 360 368 435 440 462 493 499 543 567 581 582 585 588 589 724 737 864 979 981 |
| | 543 | 864 | | 231 234 265 266 273 277 348 360 368 421 423 427 435 440 462 293 499 543 544 549 582 586 595 667 673 724 757 864 979 |
| | 583 | | | 583 597 665 666 859 968 |
| | 224 | 277 | 581 | 224 231 234 273 277 348 435 567 581 582 589 665 666 859 968 |

(*) The exchanges listed in this block are primary calls in a user's local area (See General Notes). All other exchanges are charged as "extended area" calls.

TABLE 3

| ZONE | FROM EXCHANGE | TO "PRIMARY AREA" EXCHANGE |
|------|---|---|
| 4 | 269 544 | 261 265 266 269 360 368 440 462 493 499 543 544 724 757 864 979 |
| | 265 360 440 724 979 | 231 234 265 266 269 273 348 360 368 435 440 493 499 543 544 582 584 585 588 724 737 862 864 979 981 |
| 5 | 363 472 | 244 289 363 467 475 567 585 588 589 654 737 758 981 |
| | 597 | 244 281 289 345 363 451 467 472 475 585 588 597 654 698 732 736 737 758 924 981 |
| | 289 654 475 758 | 233 286 289 345 363 451 467 472 475 585 588 597 654 698 732 736 737 758 924 981 |
| | 331 473 928 | 233 246 331 345 444 451 473 689 698 732 736 744 751 821 924 927 941 987 |
| | 585 588 467 737 981 | 233 234 244 246 265 289 348 360 363 440 444 451 467 472 475 567 582 584 585 588 589 654 689 698 724 732 736 737 751 758 862 941 979 981 987 |
| | 244 567 589 | 224 234 244 277 348 363 467 472 567 |

TABLE 3-continued

| ZONE | FROM EXCHANGE | TO "PRIMARY AREA" EXCHANGE |
|------|---|---|
| | | 581 582 585 588 589 597 737 981 |
| | 233 481 689 751 941 987 | 233 246 331 444 451 467 473 584 585 588 689 698 732 736 737 751 862 928 941 981 987 |
| | 584 862 | 246 265 360 440 444 467 584 585 588 689 724 737 751 862 941 969 981 987 |
| 6 | 286 | 281 286 289 345 399 475 654 758 924 |
| | 878 | 281 325 345 369 399 727 878 924 |
| | 281 399 | 281 286 345 399 597 878 924 |
| | 744 821 | 331 345 473 744 821 924 928 929 |
| | 929 | 345 369 727 744 821 924 929 |
| | 345 924 | 233 281 286 289 331 345 369 399 473 475 654 698 727 732 736 744 758 821 878 924 928 929 |

TABLE 4

| ZONE | FROM EXCHANGE | TO "PRIMARY AREA" EXCHANGE |
|------|---|---|
| 7 | 325 | 286 325 369 727 878 |
| | 653 | 288 359 653 727 728 |
| | 722 | 298 369 722 727 |
| | 369 727 | 288 325 345 369 653 722 727 728 878 924 929 |
| | 288 | 288 325 369 653 727 |
| 8 | 728 | 283 369 653 727 728 |
| | 298 | 298 722 734 |
| | 734 | 298 734 765 |
| | 283 | 283 725 726 728 |
| | 765 | 477 734 765 |
| 9 | 267 | 267 324 668 |
| | 537 | 324 537 725 726 |
| | 324 | 267 324 537 725 |
| | 477 | 323 477 749 765 |
| | 668 | 267 688 |
| | 323 | 323 477 |
| | 725 | 283 324 537 725 726 749 |
| | 749 | 477 425 749 |
| | 726 | 283 537 725 726 |

TABLE 5

| FROM ZONE | TO "PRIMARY AREA" EXCHANE |
|------|---|
| 3 | 226 242 266 271 321 351 368 421 422 423 427 462 491 493 499 549 586 587 595 643 661 667 669 673 754 757 884 888 893 957 |
| 4 | 224 231 234 265 269 273 277 348 360 435 440 543 544 581 582 583 665 666 724 859 864 968 979 |
| 5 | 233 244 246 289 331 363 444 451 467 472 473 475 567 584 585 588 589 597 654 689 698 732 736 737 751 758 862 928 941 981 987 |
| 6 | 281 282 286 345 399 744 821 878 924 929 |
| 7 | 288 325 369 653 722 727 |
| 8 | 283 298 728 734 765 |
| 9 | 267 323 324 477 537 668 725 726 749 |

TABLE 6

| CALLING FROM USER ZONE | CALLING ZONE | | | | | | | | |
|---|---|---|---|---|---|---|---|---|---|
| | 1 | 2 | 3 | 4 | 5 | 6 | 7 | 8 | 9 |
| | * | * | C | D | E | F | F | F | F |
| 2 | * | * | B | C | D | E | F | F | F |

TABLE 6-continued

| CALLING FROM USER ZONE | CALLING ZONE | | | | | | | | |
|---|---|---|---|---|---|---|---|---|---|
| | 1 | 2 | 3 | 4 | 5 | 6 | 7 | 8 | 9 |
| 3 | | C | B | B | B | C | D | E | F |
| 4 | | D | C | B | B | B | C | D | E | F |
| 5 | | E | D | C | B | B | B | C | D | E |
| 6 | | F | E | D | C | B | B | B | C | D |
| 7 | | F | F | E | D | C | B | B | B | C |
| 8 | | F | F | F | E | D | C | B | B | B |
| 9 | | F | F | F | F | E | D | C | B | B |

RATE CODES (FROM ZONE TO ZONE)

*Nassau County Rate Codes Omitted

TABLE 7

| RATE CODE | MINUTE CODE | DAY RATES | | EVENING RATES | NIGHT RATES |
|---|---|---|---|---|---|
| | | FIRST MINUTE | ADD'L MINUTE | | |
| A | 11 | .090 | .000 | 35% DISCOUNT | 60% DISCOUNT |
| A* | 11 | .080 | .010 | | |
| B | 11 | .130 | .030 | | |
| C | 11 | .180 | .060 | | |
| D | 11 | .230 | .080 | | |
| E | 11 | .270 | .090 | | |
| F | 11 | .310 | .100 | | |

NOTES:
Rate Code "A" denotes Untimed Service.
Rate Code "A*" denotes Timed Service.
DAY RATES: Mon. thru Fri. 8 AM to 9 PM.
EVENING RATES: Mon. thru Fri. 9 PM to 11 PM and Sun. 5 PM to 11 PM.
NIGHT RATES: Mon. thru Fri. 11 PM to 8 AM, all day Sat. on thru Sun. 5 PM.

LOCAL RATE CODES & RATES

We claim:

1. A programmable computerized telephone call cost metering device comprising:
   (a) a keyboard input device for entering data, and commands;
   (b) an output device for displaying data, and information;
   (c) means for interfacing said programmable computerized telephone cost metering device with a telephone for automatically sensing when a called party responds to and terminates a call;
   (d) means for erasably programing said programmable computerized telephone call cost metering device with a complete rate schedule of telephone costs for an entire area;
   (e) means associated with said keyboard input device for selectively and changeably entering specific service type and exchange information of the telephone being interfaced to identify the particular combination of rates from the rate schedule to be used for the telephone, and
   (f) means associated with said keyboard input device for selectively and changeably entering an access security code for protecting input and programmed information from being altered by anyone not entering the selected access security code, whereby the cost of a multiplicity of telephone calls with various rates made on said telephone will be displayed on said output device, when the exchange and any area code of a called number is inputted on said keyboard input device, and the total cost of a call will be displayed during the duration of a call.

2. A programmable computerized telephone call cost metering device as recited in claim 1, wherein means for programing further comprises solid state circuitry which allows a user to program said device by inputting information into said input device.

3. A programmable computerized telephone call cost metering device as recited in claim 1, wherein means for programing further comprises solid state circuitry which allows a user to program said device by plugging in an erasable preprogrammed read-only memory (EPROM).

4. A programmable computerized telephone call cost metering device as recited in claim 1, wherein means for programing further comprises a MODEM circuit which allows said device to receive programming information and to be programmed over a conventional telephone line.

5. A programmable computerized telephone call cost metering device as recited in claim 1, wherein said input device for entering data includes a voice-recognition device.

6. A programmable computerized telephone call cost metering device as recited in claim 1, wherein said output device for displaying data is an alphabetic-numeric display.

7. A programmable computerized telephone call cost metering device as recited in claim 1, wherein said output device for displaying data is a printer.

8. A programmable computerized telephone call cost metering device as recited in claim 1, wherein said output device for displaying data is a voice synthesizer.

9. A programmable computerized telephone call cost metering device as recited in claim 1, wherein said means for interfacing comprises a busy and pick-up detection circuit means, and a metering means, said detection circuit means initializing said metering means at the beginning of a phone call and resetting said metering means at the termination of the phone call.

10. A programmable computerized telephone call cost metering device as recited in claim 9, and comprising a central processing unit which continuously computes and simultaneously displays on said output device the total cost of the in process metered phone call.

11. A programmable computerized telephone call cost metering device as recited in claim 9, and further comprising a memory means, wherein said metering means correlates the cost of each said telephone call with the actual phone number called, and stores this information in said memory means, whereby said correlated information can be made available for further processing.

12. A programmable computerized telephone call cost metering device as recited in claim 1, further comprising a telephone and a shared input device for entering alphabetic-numeric information, said input device being the means for entering telephone numbers to be called, computer operating system commands, programing information, and data.

13. A programmable computerized telephone call cost metering device as recited in claim 1, wherein said access code is required to input any telephone number to be called by a user.

14. A programmable computerized telephone call cost metering device as recited in claim 13, wherein a said access code is required to input any telephone number having an excess of ten digits to be called by said user.

15. A programmable computerized telephone call cost metering device as recited in claim 13, wherein a said access code is required to input any telephone number having an excess of seven digits to be called by said user.

16. A programmable computerizd telephone call cost metering device as recited in claim 13, having a computer operating system wherein an internal time keeping program maintains a calendar-clock information signal which can be used as input command data, and/or outputed to an output device.

17. A programmable computerized telephone call cost metering device as recited in claim 16, wherein said access code additionally limits access according to specific times and dates as controlled by said calendar-clock information signals from said internal time keeping program; said access times and dates to be entered by said user.

18. A programmable computerized telephone call cost metering device as recited in claim 1, having a computer operating system wherein an internal cost optimizing program directs said telephone call to be placed to an external telephone system network based on cost computations so as to achieve minimum cost per said telephone call.

19. A programmable computerized telephone call cost metering device as recited in claim 1, having a computer operating system wherein a desired telephone number is automatically re-inputted by said operating system.

20. A programmable computerized telephone call cost metering device as recited in claim 1, having a computer operating system wherein said user may program said system to self signal and alert a user using a signaling device according to a set of instruction programed by said user.

21. A programmable computerized telephone call cost metering device as recited in claim 20, wherein said user signaling device is a voice synthesizer.

22. A programmable computerized telephone call cost metering device as recited in claim 1, having a computer operating system with the capability of storing at least one user program telephone number and dialing said number automatically.

23. A programmable computerized telephone call cost metering device as recited in claim 1, wherein said interfacing means comprises a pickup detector, an off hook detector, a pulse/tone dialer and means for connecting said interface directly to a telephone line.

24. A programmable computerized telephone call cost metering device as recited in claim 1, wherein said interfacing means consist of a pickup detector, an off hook detector, a pulse/tone dialer and means for connecting said interface by means of wireless transmitter and receiver.

25. A programmable computerized telephone call cost metering device as recited in claim 1, and further comprising metering means and length of time information storing means contained in said metering means for storing the length of time of a phone call made on said telephone and displaying said information on said output device.

* * * * *